Dec. 17, 1968   J. R. WYCHERLEY ETAL   3,416,364
APPARATUS FOR NON-DESTRUCTIVE TESTING OF METAL BILLETS
AND OTHER ELONGATED BAR-LIKE WORKPIECES
Filed April 28, 1965   8 Sheets-Sheet 1

Inventors:
John Ralph Wycherley
William Wilkes

By: Spencer & Kaye
Attorneys

United States Patent Office 3,416,364
Patented Dec. 17, 1968

3,416,364
APPARATUS FOR NON-DESTRUCTIVE TESTING OF METAL BILLETS AND OTHER ELONGATED BAR-LIKE WORKPIECES
John Ralph Wycherley, Penn, Wolverhampton, and William Wilkes, Walsall, England, assignors to G.K.N. Group Services Limited, Smethwick, England, a British company
Filed Apr. 28, 1965, Ser. No. 451,380
Claims priority, application Great Britain, Apr. 30, 1964, 17,918/64
12 Claims. (Cl. 73—67.8)

ABSTRACT OF THE DISCLOSURE

An acoustic flaw testing device for bar-like metal workpieces. The workpieces are moved along a feed path under which a detector head having a V-shaped guide channel defined by a plurality of rollers is positioned. The detector head rollers engage two adjacent surfaces of the workpieces. Acoustic transducer elements are mounted on the detector head adjacent to the rollers, and a liquid is supplied which forms a coupling medium between the transducers and the adjacent workpiece surfaces. Acoustic vibrations are transmitted to the workpieces from the transducers, and echoes returning from the opposite side of the workpieces and from flaws, if any, therein, are received by the transducer, amplified, and displayed on a cathode ray tube.

---

This invention relates to testing apparatus, herein referred to as being of the kind specified, for non-destructively testing metal billets or other workpieces of elongated bar-like form, herein referred to as bar-like workpieces, to detect the presence of a fault such as a void or impurity in the interior of the bar-like workpiece causing same to be of heterogeneous form or composition over its transverse cross-section, such apparatus comprising a supporting structure affording a feed path for endwise movement of the bar-like workpieces therethrough, acoustic devices for transmitting and receiving acoustic wave energy to and from each bar-like workpiece in succession in directions transverse to the length of such workpiece and to each other, rotary members associated with each of the acoustic devices and affording rolling surfaces and capable of tilting collectively to accommodate said rolling surfaces to a respective side face of the workpiece to engage therewith and maintain a gap between the associated acoustic device and this side face, means for supplying and maintaining a liquid in said gaps to form an acoustic coupling medium between each of the acoustic devices and the opposing side face of the workpiece, and a receiving means for detecting reception of reflected wave energy from a fault should such be present in any of said workpieces and furnishing an output signal for operating an indicator or other device for identifying fault-containing workpieces.

The term "acoustic wave energy" as used herein is to be deemed to include compressional or other stress waves outside the audible range of frequency as well as within the audible range.

One of the primary uses of testing apparatus of the kind specified is the non-destructive testing of bar-like workpieces in the form of metal billets produced by rolling metal blooms or ingot blooms. Such rolling operations produce substantial elongation of the bloom or ingot bloom and it is usual to control the lengths of the billets so formed by passing the rolling product through a shearing device which cuts the rolled product into predetermined lengths.

In consequence of this operation the leading and trailing end portions of the billets are frequently subjected to some longitudinal distortion and the edges of the metal formed at the junction of the shear plane or end face of the billet and its side faces may be jagged or at least form a protuberant ridge at the end of one of the side faces of the billet.

Furthermore, although the side faces of the billet are usually of flat plane form, the billet normally being of rectangular shape in cross-section, although other prismatic forms are produced, such side faces may exhibit convexity or, somewhat less frequently, concavity in the direction of their widths.

It is also possible for the billet to have a longitudinal bow or distortion, usually of less pronounced form than the longitudinal distortion occurring over the end portions.

One of the main purposes of employing testing apparatus of the kind specified is not only to detect and identify fault-containing billets but also to enable the billets to be graded having regard to the severity of the faults. Ability to achieve this relies upon consistent co-relation between the magnitude of the reflected wave energy and the severity of the fault. Factors which determine the severity of the fault are the surface area per unit length of the billet presented by the fault to the wave front of the wave energy transmitted to the billet, the thickness of the fault measured in the direction of propagation of the wave front, and the characteristic of the material constituting the fault itself, e.g., whether it is a void or crack, or an impurity such as slag, or a local variation in composition.

One of the objects of the present invention is to provide an improved arrangement of rolling surfaces in association with each acoustic device capable of maintaining greater consistency in the angular relation between the wave front of the acoustic energy and the side face of the billet towards which it is directed and from which it is received (this relationship ordinarily being one of parallelism) despite variations in the form of the billet, such as those hereinbefore mentioned, so that the received signals are less likely to suffer random changes in magnitude due to uncontrolled variations in this angular relationship.

According to the present invention testing apparatus of the kind specified is characterised in that the sets of rolling surfaces are arranged collectively to form lateral boundaries of a guide channel adjacent to the feed path which is convergent in a direction from its mouth towards its opposed inner extremity or base, and each such set presents three zones of contact with a workpiece in said feed path, at least two of such zones being spaced apart from each other longitudinally of the feed path, and at least two being spaced apart transversely of the feed path.

In a preferred arrangement the rotary members presenting each set of rolling surfaces comprise two rollers or two surface portions of a single roller spaced apart laterally of the boundary of the guide channel of which they form part and affording a gap or groove between them, and a further roller spaced longitudinally of the feed path from the first said rollers or roller and of a length to span the gap or groove as viewed longitudinally of the guide channel.

A further object of the invention is to provide in a testing apparatus of the kind specified an arrangement of parts such that the liquid coupling medium supplied to, and maintained in, the gaps between the acoustic devices and the respectively opposing side faces of the bar-like workpiece does not entail the provision of complex sealing arrangements to prevent it interfering with the proper operation of, or service life of, certain parts of the apparatus, especially those for moving the acoustic devices between an operative position adjacent to the feed path and an inoperative position remote from the feed path.

With this object in view a further feature of the invention is that the supporting structure of the apparatus comprises an upstanding frame through which the feed path extends in a generally horizontal direction and the acoustic devices and associated rotary members affording the rolling surfaces, arranged in upwardly and inwardly presented V formation, are carried by a detector head disposed below the feed path, and movable between a lowered inoperative position and a raised operative position by a power energised elevator means supported from the frame above the feed path.

Yet another object of the invention is to minimise the risk of collision between the acoustic devices and associated rotary members and mountings for the latter on the one hand and parts of the bar-like workpieces to be tested on the other hand, such as would be likely to damage the apparatus. In the specific case of an apparatus intended for the testing of metal billets, end portions of the latter likely to be subjected to distortion are liable to cause such damage.

Accordingly a further feature of the present invention is that the testing apparatus is characterised in that a detector head carrying the acoustic devices and associated rotary members affording the rolling surfaces is movable between an inoperative position remote from the feed path and an operative position at a detector station adjacent thereto by a power-energised actuating device, controlled by a control circuit including workpiece sensing devices responsive respectively to the arrival of the leading end portion of the bar-like workpiece at a downstream sensing station adjacent to the exit end of the detection station and to departure of the trailing end portion of the workpiece from an upstream sensing station adjacent to the entry end of the detector station, to produce movement of the detector head into and out of its operative position.

Further, the control circuit preferably includes a device responsive to the gap length between successive bar-like workpieces operative to prevent movement of the detector head into its operative position when this gap is less than a predetermined length. The control circuit preferably further includes additional devices responsive to faulty conditions as hereinafter more specifically described.

Yet another object of the invention is to provide a new or improved form of display device which enables a user conveniently to obtain an overall visual presentation of the fault conditions existing along the whole length of a bar-like workpiece which has undergone testing in the apparatus.

From this aspect the invention resides in the provision of a testing apparatus of the kind specified characterised in that the indicator means includes a display means comprising a plurality of display columns for displaying respective fault conditions existing in respective fractional portions of the length of each bar-like workpiece, circuit means for energising a variable length of each of said display columns in accordance with the severity of the fault condition in the fractional length of workpiece pertaining thereto, and holding means for retaining the energised condition for a sufficient period to provide a histogram display.

The invention will now be described, by way of example, with reference to the accompanying drawings wherein.

Figure 1:
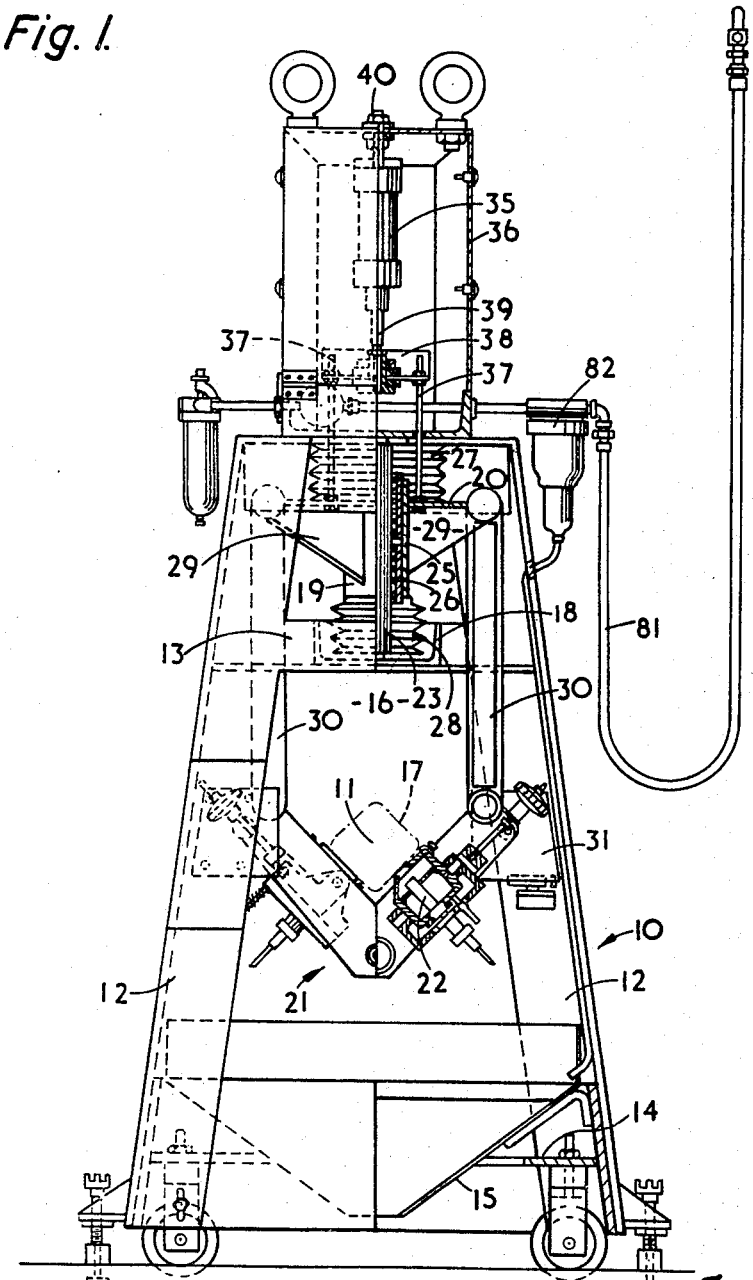
FIGURE 1 is a view in end elevation of one construction of testing apparatus of the kind specified incorporating the features of the invention.

Referring firstly to the mechanical parts of the apparatus as seen in FIGURES 1 to 6, the apparatus is intended to be used in conjunction with an input conveyor at the entry or upstream end of the feed path through the apparatus and an extraction conveyor at the exit or downstream end of such feed path respectively for feeding in bar-like workpieces such as billets of steel or possibly of non-ferrous metals, and for removing same from the apparatus. The form and construction of such conveyors do not form part of the present invention but for convenience it is indicated that they could conveniently be roller conveyors arranged with the rollers in V formation as viewed longitudinally of the feed path with axes of the rollers disposed at opposite boundaries of the channel which they afford collectively and inclined to each other at an angle appropriate to the cross-sectional shape of the workpieces, for example 90° to each other for billets of rectangular shape in cross-section.

The testing apparatus itself comprises a supporting structure in the form of a frame including two end frames 10 arranged in planes at right angles to the feed path, as represented by the axis 11. In a typical arrangement the end frames 10 each comprise a pair of laterally spaced upright girders 12 inclined inwardly towards each other in an upward direction, and connected at their upper ends by cross pieces such as 13 and at their lower ends by a cross member or base plate 14 apertured to receive a funnel-like apron 15.

The girders 12 may have an overall height of 4 feet to 5 feet and may be spaced apart to provide an aperture 16 in each end frame having a width and height appropriate to the cross-sectional dimensions of the workpieces to be fed endwise along the feed path and which typically may be between 1 foot 6 inches and 2 feet for apparatus intended to handle billets varying from 2 inches square to 5 inches square and one of which is indicated in chain lines at 17.

At the upper ends of the end frames 10 is provided a horizontal sub-frame 18 upon which is supported a guide structure 19 for an elevator head 20 as hereinafter described.

Below the feed path, as represented by the axis 11 which is horizontal, is a detector head 21 which incorporates two acoustic devices such as that seen at 22, the radiating and receiving surfaces of which are presented in respective directions to oppose adjacent transversely extending side faces of the billet when the latter is advanced along the feed path.

The detector head 21 also incorporates, in association with each of the acoustic devices, rotary members affording rolling surfaces hereinafter described in more detail for engaging with respective downwardly and outwardly presented faces at the underside of the billet 17 and maintaining a gap of predetermined dimensions between the transmitting and receiving faces of the associated acoustic devices 22 and these faces of the billet.

The detector head 21 as a whole is capable of being moved from an inoperative lowered position remote from the feed path 11 to an operative position adjacent to the feed path, and in which latter the rolling surfaces can contact the aforesaid faces of the billet, such movement being effected by an elevator device. The elevator device comprises the guide structure 19 previously mentioned which includes a vertical post 23 conveniently of circular cross-section, the lower end of which is secured to the sub-frame 18 and the upper end of which is secured to longitudinally extending beams 24 spanning the end frames 10 at their upper ends.

The elevator head 20 comprises a sleeve 25 assembled concentrically with the guide post 23 and spaced therefrom by a number, conveniently three, of vertical rows of linear ball bearing units 26 of the re-circulating type, these rows being preferably spaced apart angularly of the post 23 at equal intervals.

The upper and lower ends of the annular space between the sleeve 25 and the post 23 are closed by bellows 27 and 28.

The elevator head 20 includes laterally projecting outrigger arms 29 from which depend vertical links 30, the lower ends of which are pivotally connected to the detector head 21.

Figure 2:
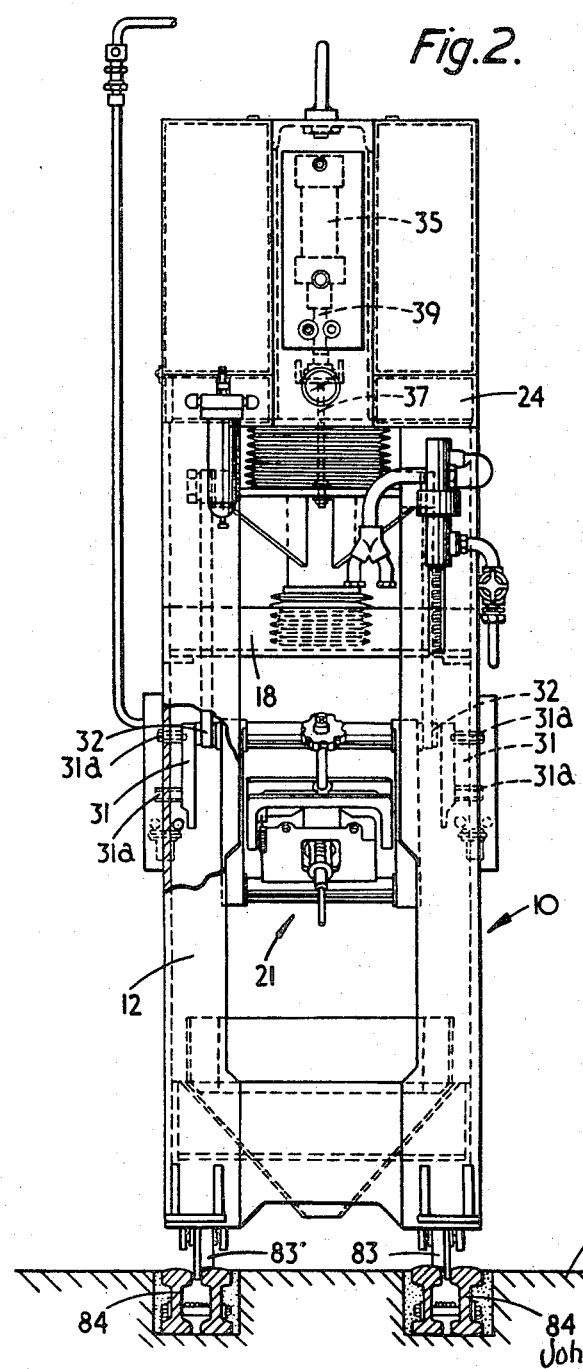
FIGURE 2 is a view in side elevation of the apparatus.
Figure 3:
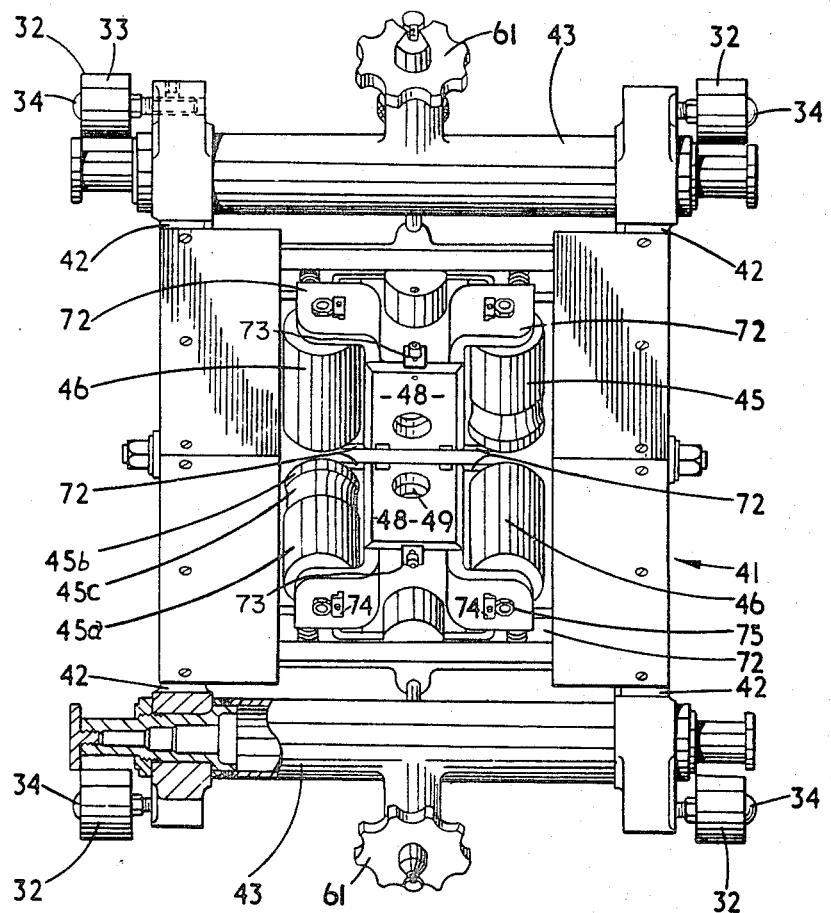
FIGURE 3 is a plan view of the detector head of the apparatus upon which are mounted the rotary members affording rolling surfaces and the associated acoustic devices.

The end frames 10 carry guide elements in the form of plates 31 having longitudinally and inwardly presented flat plane guide faces which are engaged by guide elements 32 on the detector head assembly conveniently at the lower ends of the links (FIGURES 2 and 3). These plates are mounted by means of adjusting screws 31a which permit them to be positionally adjusted longitudinally of the feed path.

The guide elements 32 comprise housings 33 containing rotary elements 34, such as balls, capable of having a rolling contact in any direction with the guide surfaces of the elements 31, and collectively positively locating or retaining the detector head against movement longitudinally of the feed path whilst permitting freedom of movement in all directions subject to the constraint afforded by the links 30 in a plane at right angles to the feed path. The guide elements 31 are of a height such that the balls 34 remain in contact therewith during raising and lowering of the detector head between its inoperative and operative positions.

For effecting this movement the elevator device further includes a piston and cylinder assembly 35 mounted in a housing 36 supported at the upper ends of the end frame members and connected operatively with the elevator head 20 by vertically extending tie rods 37 connected at their upper ends to a cross head 38 carried at the lower end of the piston rod 39 of the assembly 35. The assembly 35 is suspended by a connection means 40 from the upper end of the housing 36.

Figure 4:
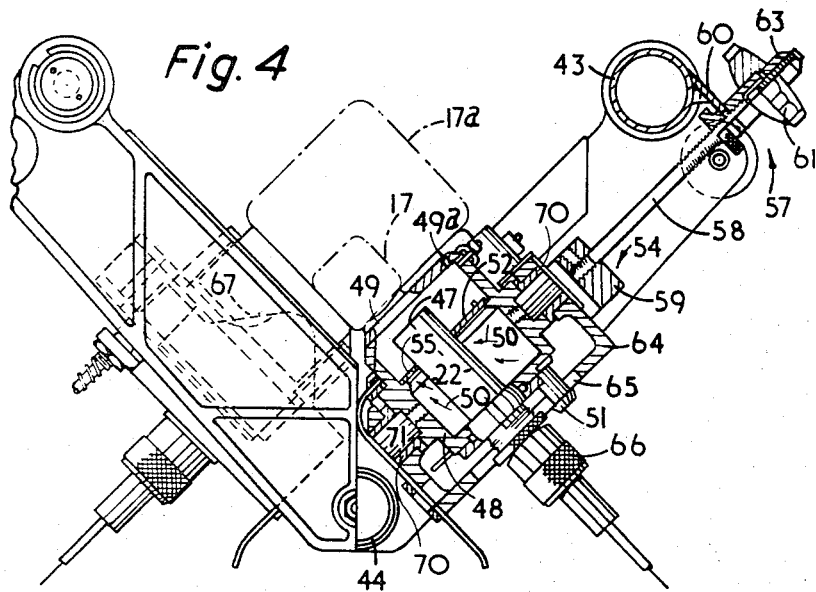
FIGURE 4 is a view in end elevation of the parts shown in FIGURE 3, the right-hand half being shown in cross-section.
Figure 5:
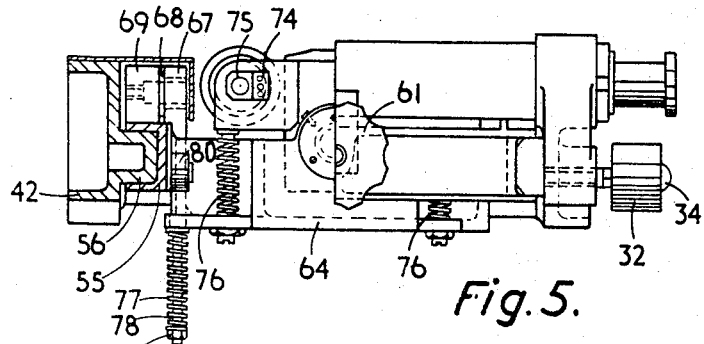
FIGURE 5 is a side elevational view of one half of the V-shaped guide channel shown in FIGURES 3 and 4 with the left-hand portion thereof being shown in cross-section.
Figure 6:
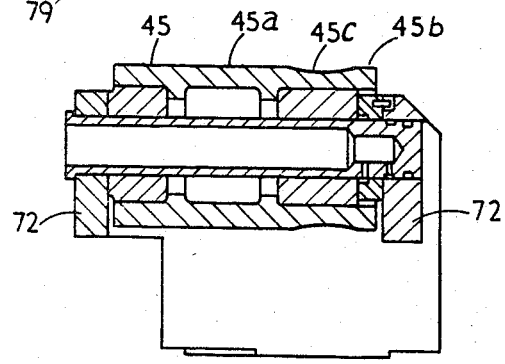
FIGURE 6 is a fragmentary view in axial cross-section showing the cross-sectional shape of the grooved roller.

Referring now to the detector head itself as seen more particularly in FIGURES 3 to 5, the rotary elements and acoustic devices are all collectively supported from a main member or base of V-shape, as viewed in end elevation, and comprise end members 41, the limbs 42 (FIGURE 5) of which are of channel-section, the upper ends of these limbs are connected to each other by tubular members 43. These limbs are also connected to each other at their lower ends by a tubular member 44.

The acoustic devices and associated rotary members affording the rolling surfaces are identical at each side of the detector head and for this reason one only will be described.

The rotary members comprise in each case two rollers 45 and 46 which are spaced apart from each other longitudinally of the feed path and are arranged with their axes at right angles to the feed path and parallel to each other. The acoustic device 22 comprises a probe of generally cylindrical form disposed between the two rollers and arranged with its operative radiating and receiving face 47 presented upwardly and inwardly towards the opposing side face of the billet 17.

The probe 22 is contained within a chamber 48 having an opening 49 immediately above and in axial alignment with the operative face 47 of the probe, and through which water is continuously caused to flow as indicated by the arrows 50 to establish acoustic coupling between the probe and the opposing side face of the billet 17. The water enters the chamber 48 by way of an inlet pipe 51. The chamber is sub-divided by a baffle 52 having a single opening 53 adjacent to its inner lower margin. The only outlet from the lower sub-division of the chamber is through the opening 53 to the upper part of the chamber. The upper wall 48 of the latter, in addition to having the opening 49 for the outlet of water, is a small outlet opening 49a through which any air bubbles entering the upper part of the chamber through the opening 53 can pass.

The rollers 45 and 46, together with the probe chamber 48, are collectively supported from the V-shaped base or main member of the detector head, firstly through the intermediary of a slide 54 (FIGURES 4 and 5) of generally U-shaped as viewed in plan. Its lateral members 55 are of channel shape and embrace correspondingly shaped guide ribs 56 formed on the inner faces of the limbs 42 and are movable therealong under the control of a screw and nut mechanism 57. This latter comprises a screw threaded rod 58 fixed to the transverse limb 59 of the slide 54 and at its outer end carrying a rotary adjusting nut 60 having a hand-wheel 61, the nut being journalled in a bearing opening formed in a lug 62 on the tubular member 43. The outer end of the rod 59 is preferably graduated, as indicated by the marks 63, in terms of the size of billet to be handled. Registration of a particular mark with the outer end of the nut and hand-wheel assembly so that such mark is just visible then indicating that the probe is disposed with its axis coincident with the centre of the width of the opposing face of the billet.

Further, the rollers 45 and 46 and probe chamber 48 are supported operatively from the associated slide 54 through the intermediary of a gimball ring 64. This is in the form of a shallow open-topped rectangular box-shaped member having an aperture 65 in its base to permit of electrical coupling to the probe by way of a connector fitting 66, and having end walls incorporating upwardly and inwardly projecting triangular bearing bosses 67 from which project bearing pins 68 engaging in bearing openings afforded by opposed parts 69 of the slide 54, the axis of these bearings passing through a plane parallel to the feed path and containing the centreline of the probe 22.

Further, the gimball ring 64 is provided in its upper and lower walls with bearings 70 in which engage stub spindles 71 carried by the probe chamber.

The rollers themselves are rotatable on spindles extending between the limbs 72 of generally U-shaped members provided on the probe chambers at opposite ends.

The top wall of each probe chamber is readily removable by release of a clamp 73 to allow access to be obtained to the probe and the roller spindles can be withdrawn axially by release of clamping plates 74 which permit bearing bushes 75 to be rotated to a different one of four positions spaced apart at 90° from each other, for the purpose of obtaining uniform wear as well as for the purpose of allowing the spindle to be withdrawn axially when a roller is required ot be removed.

Between the gimball ring 64 and the probe chamber 48 two longitudinally spaced coiled compression springs 76 provide yieldable centering of the assembly of probe chamber and roller assembly with respect to angular movement about the stub spindles 71. A compression spring 77 on a threaded pin 78 is disposed between adjusting nuts 79 at the outer end of this pin and the underside of the gimball ring 64, whilst at its inner end the pin 78 has an eye 80 by means of which it is pivotally connected to the slide 55. The gimball ring can move against this spring (which initially may be be unstressed) in a direction such as to increase the included angle of V-shaped guide channel defined by the rolling surfaces of the rollers 45 and 46 in combination.

Referring specifically to the rollers 45 and 46, the former in each case presents two axially spaced surface portions 45a and 45b which are both of plane cylindrical form. Between these surface portions the surface of the roller is formed with a groove 45c so that as a whole the roller affords two axially spaced zones of contact, each consisting of a line with the opposing side face of the billet.

These zones of contact are, of course, spaced apart in the direction of the width of such side face and the position of the roller and probe assembly would ordinarily be adjusted, as previously indicated, to ensure that the median plane of the gap 45c which pases through the axis of the probe is co-incident, or approximately co-incident, with a median plane normal to the side face of the billet opposed to the probe.

The other roller 46 has a surface of plane cylindrical form which affords a single zone of contact in the form of a line with the opposing side face of the billet, such zone of contact spanning the two zones of contact presented by the roller 45, as viewed in a direction longitudinally of the billet.

This arrangement provides engagement with the side face of the billet over three separate spaced zones, of which that afforded by the roller 46 is spaced longitudinally from both of those afforded by the roller 45 and the latter are spaced apart from each other laterally of the direction of feed movement. This arrangement is effective to reduce random variations in the distance between the operative face 47 of the probe 22 and the opposing side face of the billet, such as would tend to take place if two plain cylindrical rollers such as 46 were employed instead of rollers 45 and 46 and the side face of the billet exhibited a convex shape as seen in transverse cross-section.

With the arrangement described the zone of contact existing between the roller 46 and the side face of a billet of this form would be shortened to a point or a very small length of the normal line which extends for the length of the roller 46, the resulting three areas of contact afforded by the rollers collectively thus being situated at the apexes of a triangle within the area of which the probe 22 is situated, as viewed in a direction normal to the side face of the billet.

The cross-sectional shape and depth of the groove is preferably such that there is practically no risk of a longitudinally extending corner or edge face of a billet catching out remaining in abutment with the lateral boundary of the groove. Thus it may, as shown, be of shallow concave part cylindrical form, typically having a width of about 1 inch and a radical depth of about 0.06 inch. The external angles presented between the lateral margins of the concave groove surface and the adjacent ungrooved surface portions 45a and 45b only slightly exceed 180°, for example by about 5° to 15°.

If desired the single roller 45 having the surface portions 45a, 45b could be replaced by two separate rollers, the adjacent end faces of these would then be shaped to provide a gap or groove having lateral boundaries of the form afforded by the lateral margins of the groove or of similar form.

It will be understood that due to longitudinal distortion at the end portions of the billets and lateral divergence of the billets from the feed path 11 it frequently occurs that the first engagement between the billets in a region near the leading end portion and the roller 45 occurs at a position near the higher end of the surface portion 45a. It is, therefore, important that there should be no obstruction to the free downward sliding movement of the billet over the surface portion 45a, past the groove 45c and on to the surface portion 45b. It is also desirable that the longer surface portion 45a or roller should be uppermost.

It will also be observed that the grooved roller is disposed in the leading position with respect to one assembly of probe and rollers and in the trailing position wtih respect to the other assembly.

Due to the disposition of the elevating piston and cylinder assembly 35 and the guide structure 19 above the feed path 11, these parts are not exposed to contact with water flowing out of the opening 49 of the probe chamber, such water collecting in the apron 15 and flowing into a drain channel (not shown).

It is in consequence unnecessary to provide liquid tight casings for these parts to ensure their satisfactory operaiton and long service life. Furthermore, any longitudinal stresses on the head 21 are borne by the guide elements 31 and 32 and will not be transmitted to the elevator device as a whole.

An air supply line 81 and filter 82 is provided for conducting a suitable supply of compressed air to the assembly 35.

The apparatus as a whole is rendered mobile by the provision of flanged wheels or rollers 83 at the lower ends of the end frames 10 engaging with rails 84 in a floor surface 85.

Figure 7:
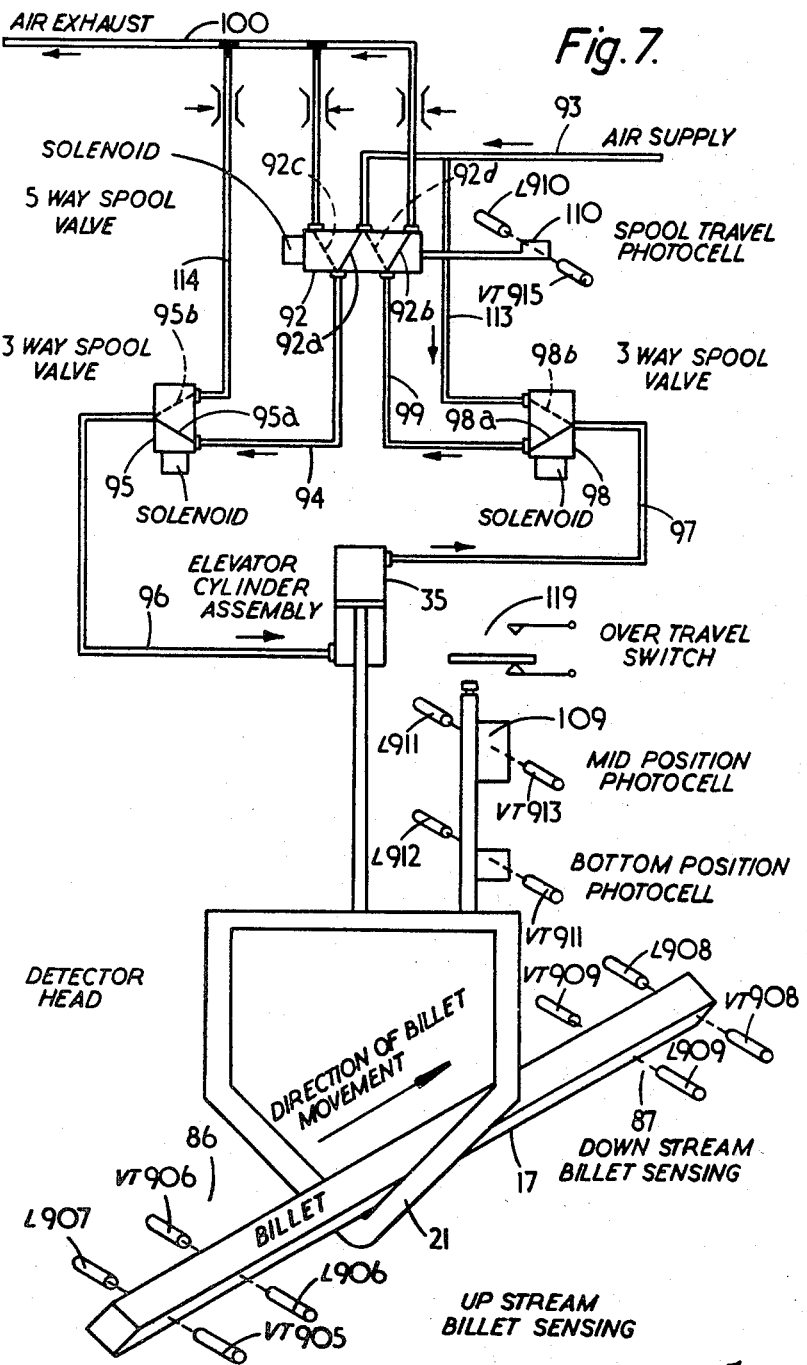
FIGURE 7 is a schematic diagram showing the general arrangement of sensing devices of a control circuit controlling the operation of an elevator device for raising and lowering the detector head.
Figure 8:
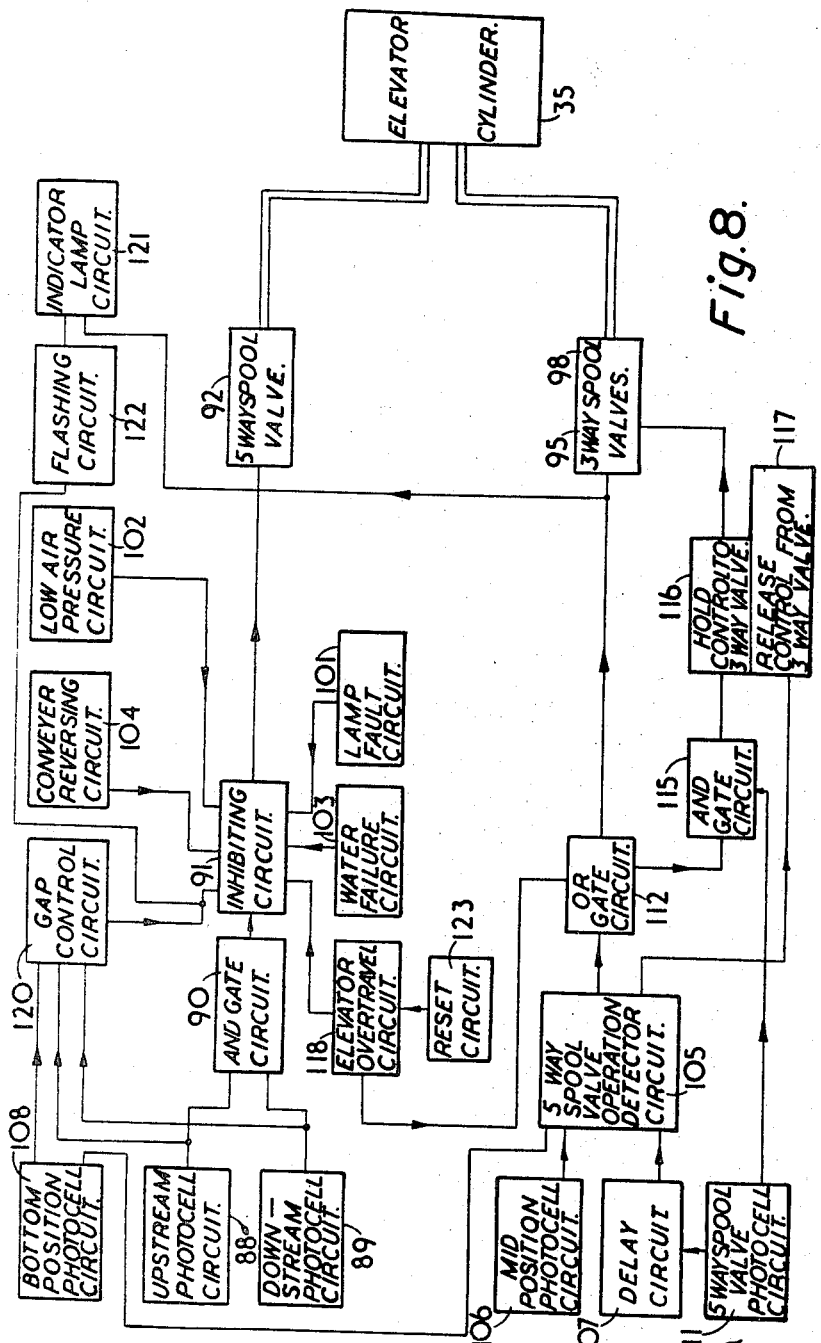
FIGURE 8 is a schematic circuit diagram showing the control circuit itself.

The piston and cylinder assembly 35 which forms part of the elevator device for raising the detector head 21 from its lowered inoperative position to its operative position adjacent to the feed path is controlled by a control circuit illustrated in FIGURES 7 and 8 to which reference is now made.

This control circuit provides the following safety features:

(1) It prevents the detector head 21 being raised to its operative position until the leading end portion of the billet 17 has arrived at a downstream sensing station at the exit end of the detection station at which the head 21 is situated, and ensures that the head is lowered to its inoperative position as soon as the trailing end portion of the billet leaves an upstream sensing station at the entry end of the detection station.

(2) It provides for maintenance of the detector head 21 in its lowered inoperative position if there is an insufficient gap between successive billets.

(3) It provides for return of the detector head to its lowered inoperative position under the control of a subordinate valve (the three-way spool valves hereinafter referred to) in any of the following events:

(A) Operation of an over-travel switch if the detector head is raised too high.

(B) Failure of the main control valve (five-way spool valve hereinafter referred to) in conjunction with the piston and cylinder assembly 35 to return the detector head to its lowered position sufficiently rapidly in normal operation.

(C) Jamming of the five-way spool valve in a position producing movement of the detector head to its raised position.

(4) It prevents the detector head being raised from its inoperative lowered position or returns it to such position in the event of:

(A) Failure of photo-cell lamps to an extent such that photo-cell assembles become inoperative.

(B) Failure of water supply to the gaps between probes and opposing side faces of the billet.

(C) Reduction of air pressure for the piston and cylinder assembly 35 below a predetermined value, and (D) Operation of a line reversing switch reversing the direction of motion provided by the conveyors associated with the apparatus.

The way in which the circuit provides these facilities and its overall manner of operation will best be understood by describing a sequence of operations. It will be assumed that initially the detector head 21 is in its lowered inoperative position and that there is no billet present at any of the sensing stations previously mentioned.

Forward movement of a billet along the feed path by means of the conveyor at the upstream end of the feed path first advances this to a position at which it intercepts light beams at an upstream sensing station 86 passing between two photo-cell and lamp assemblies L907 and VT905, and L906 and VT906.

Further forward travel of the billet 17 causes this to intercept further light beams passing between lamp and photo-cell assemblies at a downstream sensing station 87 between lamps and associated photo-cells L908 and VT908, and L909 and VT909.

The photo-cell and lamp assemblies at the two stations are connected in respective circuits shown schematically in FIGURE 8 at 88 and 89, which have outputs fed to an "AND" gate circuit 90, which in turn feeds an output through an inhibiting circuit 91 to the operating solenoid of the five-way spool valve 92. This moves from an initial position to an operated position, left to right as seen in FIGURE 7, to establish an air supply under pressure from the pipe 93 through the five-way spool valve, as indicated by the full line connection 92a, to a pipe 94 and thence through a subordinate three-way spool valve 95, as indicated by full line connection 95a, to pipe 96 and thence to the lower end of the piston and cylinder assembly 35 to raise the piston thereof. The upper end of the cylinder is connected by a pipe 97 through a second subordinate three-way spool valve 98 by way of connection 98a to a pipe 99 and thence through the valve 92 by way of a connection 92b to the exhaust pipe 100.

If the leading end portion of the billet does not arrive at the downstream sensing station 87 the gate circuit 90 will not pass a signal through the inhibiting circuit to the valve 92 and the detector head will remain in its lowered position.

Further, if both of the lamp and photo-cell pairs at either of the stations 86 and 87 become inoperative a lamp fault circuit 101 feeds a signal to the inhibiting circuit 91 preventing passage of the signal therethrough from the gate circuit 90 to the valve 92 and the latter remains in its initial position.

Signals are also supplied to the inhibiting circuit 91 to prevent movement of the valve 92 from its initial positions, from a low pressure air detector circuit 102 connected to the air supply pipe 93 and furnishing a signal in the event of the pressure falling below a predetermined value, a water failure circuit 103 connected to the water supply pipe which feeds the probe chambers and contains a vane or valve element responsive to water pressure or flow, and a conveyor reversing circuit 104 which feeds an inhibiting signal to the inhibiting circuit 91 in the event of an operator changing the direction of movement of the conveyor to either end of the apparatus by operation of a manually controlled reversing switch.

Assuming correct operation of the five-way spool valve 92 the detector head is raised to its operative position and remains in this position during forward travel of the billet 17 until the trailing end portion of the latter moves out of the upstream sensing station 86 so that the associated photo-cell circuits 88 no longer passes an output to the gate circuit 90. The five-way spool valve thereupon reverts under biasing means, for example a weight or spring, to its initial position and the connections through the five-way spool valve 92 and the subordinate three-way spool valves 95 and 98 are then those represented by broken lines 92c, 92d, 95b and 98b (FIGURE 7), placing the upper end of the piston and cylinder assembly 35 in communication with the pressure supply pipe 93 and the lower end in communication with the exhaust pipe 100 so that the detector head 21 is driven in a downward direction towards its lowered inoperative position. This ensures that the rollers 45 and 46 and associated probes are withdrawn clear of the trailing end portion of the billet before the latter passes through the detector station. To prevent or reduce the risk of damage occurring as a result of insufficiently rapid downward travel of the detector head a five-way spool valve operation detector circuit 105 is provided which receives inputs from a mid-position photo-cell circuit 106, a delay circuit 107 and a bottom position photo-cell circuit 108. The mid-position photo-circuit is supplied with a signal from a lamp and photo-cell assembly L911, VT913 the light beam of which is intercepted by an interceptor element 109 on the detector head at all positions of the latter below the mid-positions, or at some other selected intermediate position between its operative and inoperative positions, so that for the first half of the downward travel an output is provided from the circuit 106 to the circuit 105 and such output is thereafter discontinued.

The delay circuit 107 provides an output which is initiated from a spool travel photo-cell and lamp assembly L910 and VT915 connected in a circuit 111. The light beam is intercepted by an interceptor element 110 only when the five-way spool valve is in its operated position as seen in FIGURE 7. A signal from a bottom position photo-cell circuit in which lamp and photo-cell assembly L912, VT911 is connected is also fed into the circuit 105 to render this operative only when the detector head is raised from its inoperative or lowered position.

If the rate of downward travel of the detector head is such that a signal is concurrently received by the circuit 105 from both the delay circuit 107 and mid-position photo-cell circuit 106 an output is fed to an "OR" gate circuit 112 and hence to the solenoids of the three-way spool valves 95 and 98 providing a direct connection from these to the pressure and exhaust pipes 93 and 100 to drive the detector head down independently of the five-way spool valve. The pipes 113 and 114 which connect the three-way spool valves 98 and 95 to the pipes 93 and 100 can, if desired, be made of cross sectional dimensions exceeding the effective cross sectional dimensions of the equivalent connections through the five-way spool valve. Alternatively or in addition they provide shorter more direct connections, and in either case ensure downward travel of the detector head at a sufficiently high rate to avoid damage to the probes and roller assemblies by the trailing end portion of the billet.

This manner or operation, that is to say take-over of control by the three-way spool valves also occurs if the five-way spool valve should jam in its operated position so that an output is fed from the circuit 111 to an "AND" gate circuit 115 as well as the latter circuit receiving a further input from the "OR" gate circuit 112 by virtue of operation of the circuit 115 which will inevitably take place due to delay in the starting time of the downward movement of the detector head.

Under this combination of circumstances the "AND" gate circuit 115 passes an output through a circuit 116 to the three-way spool valves 95 and 98 retaining these in a position permanently to take control of the supply of air to the assembly 35. The function of the circuit 116 is thus to hold control to the three-way spool valves. Such control can only be released by a signal passed through an associated circuit 117 from the circuit 105 when operation of the five-way spool valve reverts to normal, that is to say it becomes unjammed and produces descent of the detector head at a sufficiently high speed.

The "OR" gate circuit 112 can also receive a signal from an over-travel circuit 118 including the over travel switch 119 FIGURE 7 which is operated by the detector head rising to a position above its operative position. The circuit 118 also supplies an inhibiting signal to the circuit 91.

The upstream and downstream photo-cell 88 and 89 also provide signals to a gap control circuit 120 which receives input from the bottom position photo-cell circuit. The gap control circuit provides an inhibiting output to the inhibiting circuit 91 whenever the trailing end portion of a billet which has passed through the detection station fails to clear the downstream sensing station before the leading end portion of the next succeeding billet arrives at the upstream sensing station and the detection head has not reached its lowered or inoperative position.

An indicator lamp energised by a lamp indicator circuit 121 is brought into operation to display abnormal conditions. In the event of the three-way spool valves 95 and 98 being brought into operation to take over or override normal control of the supply of air to the piston and cylinder assembly 35 instead of the latter being controlled by the five-way spool valve 92, a signal is fed from the "OR" gate circuit 112 to the lamp indicator circuit to cause the lamp thereof to be continuously energised.

If the gap control circuit provides an inhibiting output from the circuit 91 this is also fed through a flashing circuit 122 to produce energisation of the indicator lamp intermittently.

It will be evident from the foregoing description that the subordinate three-way spool valves 95 and 98 cannot produce upward movement of the detector head 21 from its lowered inoperative position to its operative position, and accordingly it is necessary for the circuit to be restored to a condition in which control of the supply of air is resumed by the five-way spool valve before the detector head can again be so raised.

In the case of operation of the elevator over-travel circuit 118 this can only be re-set manually by means of a switch in a re-set circuit 123.

Figure 9:
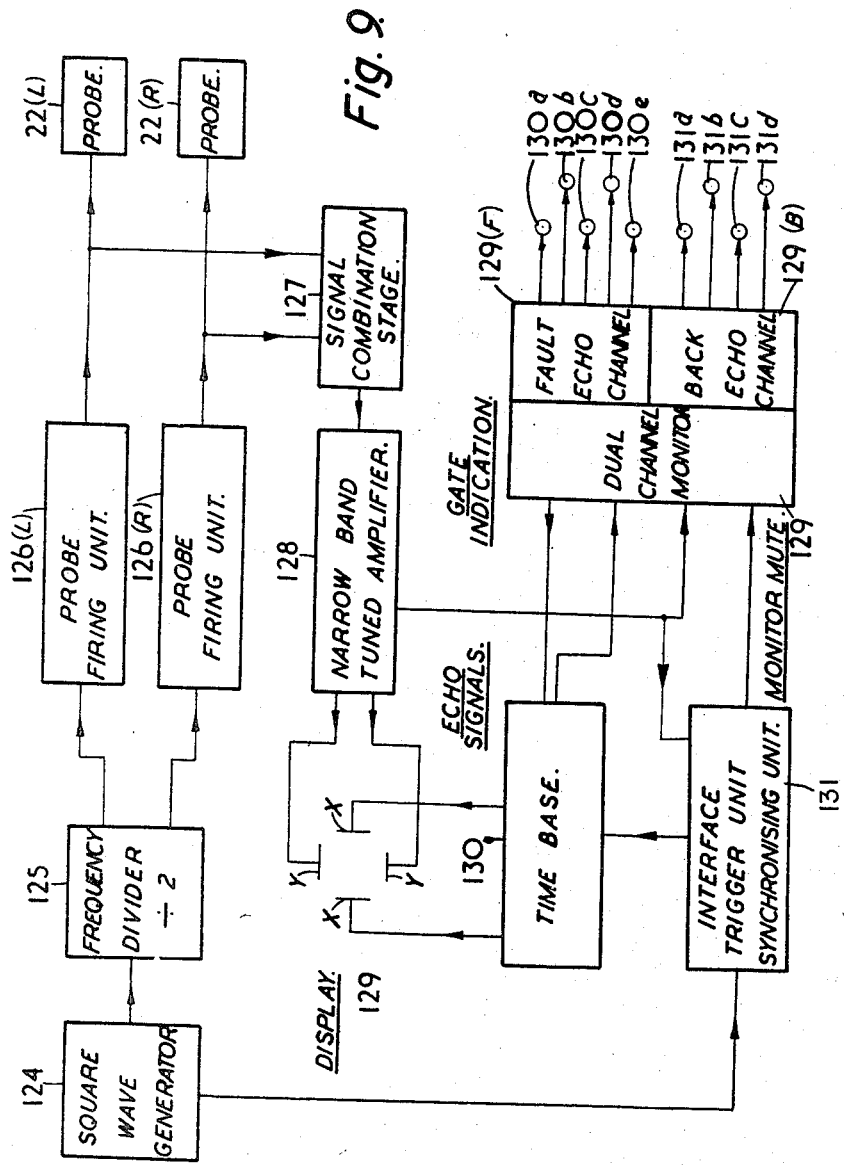
FIGURE 9 is a schematic circuit diagram of the transmitting and receiving means of the apparatus and certain parts of the indicating means.
Figure 10:
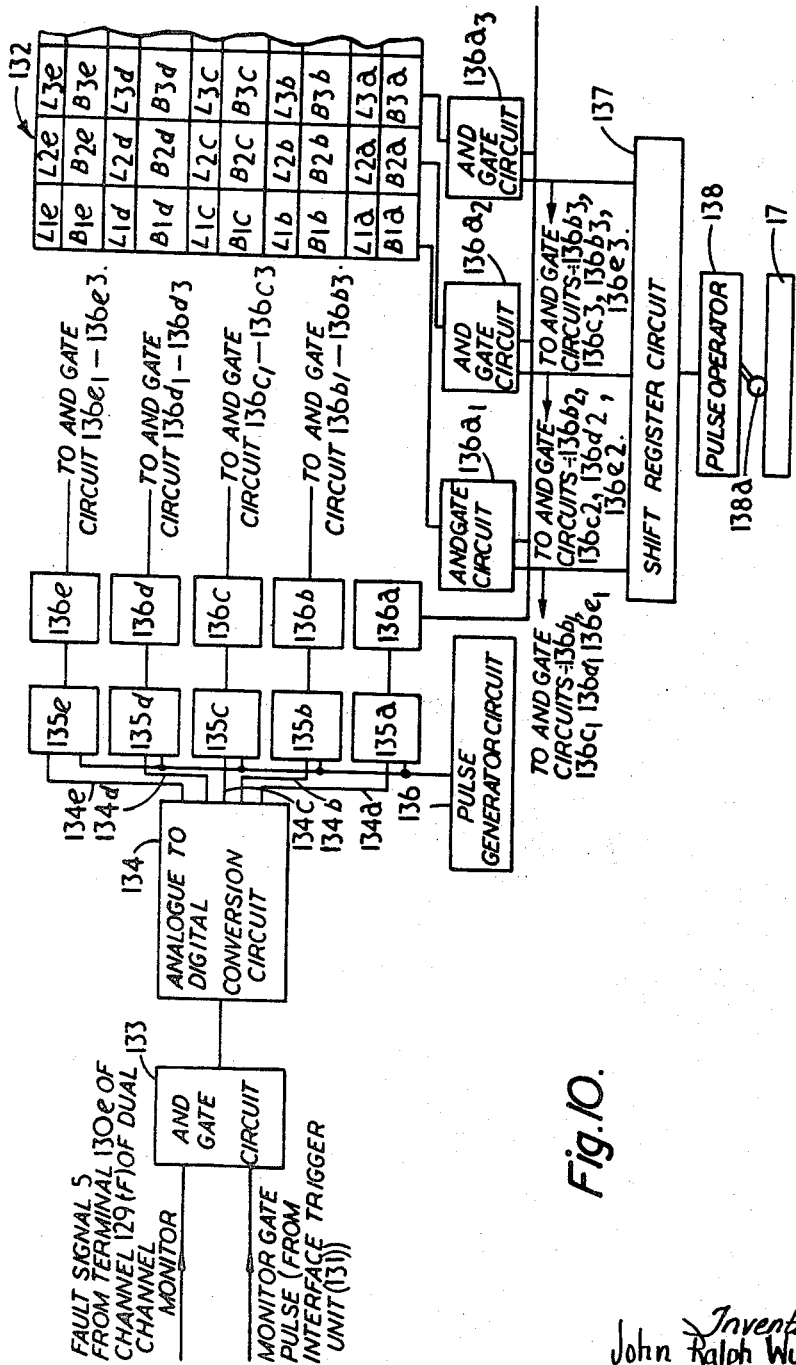
FIGURE 10 is a schematic circuit diagram of a further part of the indicator means providing a histogram display.

Reference is now made to FIGURES 9 and 10 which illustrate schematically the circuits for transmitting and receiving electrical signals to and from the probes 22 and for displaying and utilising the receiving signals for controlling recording and marking apparatus.

For convenience the probes are designated 22(L) and 22(R) signifying left and right as viewed along the feed path in a direction looking downstream. Both of these probes are operatively connected with a signal generator unit 124 through the intermediary of a frequency divider circuit 125 providing two outputs fed to respective probe firing units 126(L) and 126(R) which are energised out of phase with each other such that probe 22(L) fires or transmits in the centre of the intervals between firing or transmitting of the probe 22(R).

The generator 124 generates a carrier wave conveniently having a frequency in the range 0.5 to 15 megacycles per second and which is amplitude modulated to provide square wave pulses. The pulse length may typically be of the order of 5 microseconds and the repetition frequency may be in a range from 200 to 1000 pulses per second and maintained constant at the selected value, for example 400 pulses per second, so that each probe 22(L) and 22(R) is fired 200 times per second.

The selected carrier frequency should coincide for that applicable to the probe and may typically be 4 megacycles.

The probes are of the piezo electric type and act as both transmitting and receiving transducers. Signals received by probes by virtue of reflection of the acoustic wave energy from a fault in the interior of the bar-like work piece such as the billet 17 previously referred to, are fed down respective channels to a signal combination circuit 127 having a single output channel feeding the largest of the two signals received from the incoming channels to a narrow band tuned amplifier circuit 128 the output of which, consisting of the modulation envelope of the reflected signals, is applied to the vertical deflection or Y plates of a display cathode ray oscilloscope 129.

The horizonal deflection or X plates of the oscilloscope 129 are fed from a time base circuit 130 providing a linear time base sweep which is started at a time controlled by interface trigger circuit 131 and which is coincident with the arrival of the echo of this transmitted pulse from the face of the billet opposed to the probe, herein referred to as the front face. Employment of the front face echo as a starting point for the time base is advantageous in that it eliminates variation in the distance between the probe concerned and this front face as a source of error.

An output signal from the narrow band tuned amplifier 128 and consisting of all of the signals received on the probes, namely the front face signal, flaw signals and signals from the opposed or back face of the billet, are fed to a dual channel monitor circuit 129. In the circuit 129 signals in the two channels are gated so that those contained in one channel are confined to fault signals, that is to say reflections received from a zone in the interior of the billet starting a short distance from the front face and terminating a short distance from the back face, this channel being designated the flaw echo channel and indicated at 129F. It will be understood by those skilled in the art that the flaw signals are confined to a single channel by means of a gating signal which starts shortly after the echo is received from the front face of the workpiece and terminates shortly before the echo is received from the back face of the workpiece. Since the workpieces are relatively uniform in size and composition, a fixed time period can be used for this gating signal, the particular length of the time period depending, of course, on the particular dimensions and composition of the workpiece involved. The signals in the other channel are gated in the same manner to confine these signals to those received from the back face. This channel is designated 129B, the requisite gating signals are received from the interface trigger unit 131.

In the fault echo signal channel 129F six output terminals are provided, 130a being taken to a counter, which for each billet indicates the total number of received fault pulses occurring during the passage of the billet through the detection station. 130b provides an output for a pen recorder. 130c provides an output for an alarm lamp. 130d provides an output for a paint spray device for marking billets containing faults or more than a predetermined severity. Terminal 130e provides an output to a histogram display device illustrated diagrammatically in FIGURE 10.

The back echo channel 129B has four output terminals 131a to 131d for providing outputs respectively to a counter, pen recorder, alarm lamp, and paint spray. These outputs serve to indicate that a satisfactory test has been applied to the billet concerned, since the presence and magnitude of the reflected signal from the back face indicates that there has been transmission of an effective transmitted pulse from the probes and that the liquid coupling medium has been effective to convey this pulse to the billet.

Referring now to FIGURE 10 this illustrates diagrammatically a histogram display device for indicating the fault state of each individual billet as it passes through the detection station.

The device comprises a display assembly proper 132 which comprises an array of lamps arranged in a number of vertical columns situated side-by-side. Any selected number of vertical columns may be employed, for example 1 per foot length of the billet under test so that there may be 20 to 30 of such columns although for the sake of convenience only three are illustrated.

Again the number of lamps provided in each column may be varied and five are illustrated by way of example.

The columns are numbered 1 to 3 and the lamps contained therein are designated $L_{1a}$ to $L_{1e}$ for the first column and corresponding designations are adopted for the remaining columns. Such lamps are respectively energised or de-energised by associated bi-stable energising circuits which for convenience are shown incorporated in the block 132, although it will be understood that in practice lamps in a given column, for example those $L_{1a}$ to $L_{1e}$ would preferably be disposed adjacent to each other in the vertical direction so that the fraction of the height of the column energised and illuminated would be clearly apparent. The associated bi-stable circuits for the various lamps are designed $B_{1a}$, $B_{1b}$, etc.

The incoming signal to the display device is from terminal 130e of the channel 129F of the dual channel monitor circuit 129 and this forms one of the inputs to an "AND" gate circuit 133, the other input of which consists of the monitor gate pulse which "encloses," in time, the region from within which fault signals can be received from the interior of the billet, such pulse being derived from the interface trigger circuit 131.

The output from the "AND" and gate circuit 133 consists of a pulse of magnitude dependent upon the fault signal received from the terminals 130e and is fed to an analogue to digital conversion circuit 134 having a number of channels corresponding to the number of lamps in each vertical column, for example five, these channels being designated 134a to 134e.

The existence of an output from any given channel is dependent upon the magnitude of the input pulse to the circuit 134. For maximum fault signal all five output channels would be energised to present outputs, and for minimum fault signal only the lowest 134a would be so energised, and fault signals of intermediate severity would produce outputs in the two, three or four lowest channels as the case may be. The duration for which the outputs persist in each channel is dependent upon the transit time of passage of a fault past the probes.

The respective channels 134a to 134e are connected to "AND" gate circuits 135a to 135e, each of which receives as a second input a succession of pulses from a pulse generator circuit 136, the pulse repetition frequency of which is controlled by the speed of the billet. For example the pulse generator may be a switch or a rotary or oscillatory electromagnetic generator driven from one of the rollers, 45, 46. The existence of outputs from the "AND" gates 135a to 135e is dependent firstly upon the existnce of an output from the associated channels 134a to 134e. When present, it consists of pulses proportional in number to the length of the fault. These pulses are fed into the pre-set counters 136a to 136e, each of which furnishes an output only if a predetermined number of input pulses are exceeded. The counters may all be set to the same predetermined number or to different numbers if desired.

The output from each pre-set counter circuit is fed to each of a number of "AND" gate circuits pertaining respectively to successive unit lengths of the billet under test. Only those fed from the pre-set counter circuit 136a is shown and are designated $136a_1$, $136a_2$, $136a_3$.

A second input to each of these "AND" gate circuits is taken from a respective stage of a shift register circuit 137, the input or shifting pulses of which are derived from a pulse generator device 138 adapted to furnish a predetermined number of pulses per unit length of the billet under test. The pulse generator device 138 may thus include a roller element 138a engaging the surface of the billet 17 so as to be rotated by longitudinal movement thereof, the rotary element serving to drive a switch armature forming part of a rotary or oscillatory electromagnetic generator unit, or other pulse forming circuit elements.

The shift register circuit 137 has a number of stages equal to the number of vertical columns and number of "AND" gate circuits $136a_1$ to $136a_3$ etc., all except one of these gate circuits being maintained in the closed or "off" condition at any given time.

The particular gate circuit which is open or "on" to permit passage of signals therethrough is determined by the number of pulses which have been fed into the shift register circuit from the start of operation of the pulse generator device 138 occurring by engagement of the rotary element thereof with the leading end portion of the billet.

Consequently it will be evident that the first column of lamps will be made operative to indicate the fault condition pertaining in the first unit length of the billet (excluding end portions of the latter in relation to which the detector head and devices incorporated therein are not operative), the second column of lamps will be made operative in relation to the second unit length and so on.

The outputs from the "AND" gate circuits $136a_1$ to $136a_3$ are fed to respective bi-stable circuits $B_{1a}$ to $B_{3a}$ respectively.

Consequently the lowest lamp in any given column $L_{1a}$, $L_{2a}$, $L_{3a}$, etc. will be energised if the minimum fault condition is indicated in respect of the unit length of the billet pertaining to that column.

It will be evident from the foregoing description that the presence of an output at any one of the channels 134a to 134e is dependent upon the magnitude of the maximum fault signal received by either probe. This in turn is dependent upon the area of the fault presented to the wave front radiated from and reflected towards the probe which furnishes the maximum fault signal.

The number of lamps illuminated in any given column therefore provide an indication of severity of the fault primarily in terms of the area presented by the fault.

What we claim then is:

1. In testing apparatus for non-destructively testing bar-like metal workpieces and comprising a supporting structure affording a feed path for movement of each of a succession of said workpieces therethrough, a detector head disposed in offset relation to said feed path and including acoustic devices incorporating transducer means for transmitting and receiving acoustic wave energy to and from said workpiece in respective directions transverse to said feed path and to each other, means for supplying a liquid to form an acoustic coupling medium between each of said transducer means and an opposing side face of said workpiece, and receiving means for detecting reception reflections of said wave energy from a fault in said workpiece, the improvement comprising (a) a plurality of rotary members on said detector head arranged in sets disposed adjacent to and associated with said transducer means respectively, each such set presenting rolling surfaces defining a respective lateral boundary of a guide channel extending longitudinally of said feed path and offset therefrom, said guide channel having an open mouth presented towards said feed path and converging towards its opposing extremity, (b) mounting means on said detector head carrying each said set of rotary members and movable angularly about mutually perpendicular axes parallel to that one of said lateral boundaries defined by said set, (c) said rolling surfaces of each said set of rotary members presenting three surface portions for engagement with that one of the side faces of said workpiece opposed to said transducer means associated with said set, (d) at least two of said three surface portions being spaced apart from each other longitudinally of said feed path, and at least two of said surface portions being spaced apart from each other transversely of said feed path.

2. The movement claimed in claim 1 wherein each set of rotary members comprises rollers disposed respectively at positions upstream and downstream of the associated transducer means, and at one of said positions presenting surface portions spaced apart transversely of said feed path separated by intervening depression and at the other of said positions presenting a surface portion spanning said depression as viewed in a direction longitudinally of said feed path.

3. The improvement claimed in claim 2 wherein of said two surface portions which are separated by said depression that disposed nearest the mouth of the guide channel is of greater axial length than that disposed nearest the inner extremity of said channel.

4. The improvement claimed in claim 2 wherein between said laterally spaced surface portions is disposed a surface forming the boundary of said depression and whereof the lateral margin adjacent to that one of said surface portions nearest the inner extremity of said channel slopes gradually towards the bottom of said depression to minimise the risk of obstruction to lateral sliding of said workpiece axially along said laterally spaced surface portions towards the inner extremity of said guide channel.

5. The improvement claimed in claim 1 further comprising guide means on said detector head defining guideways respectively extending generally parallel to said lateral boundaries of said channel, said guide means carrying said mounting means movable along said guideways to positionally adjust said sets of rotary members towards and away from the inner extremity of said channel.

6. In testing apparatus for non-destructively testing bar-like metal workpieces and comprising a supporting structure affording a feed path for endwise movement of each of a succession of said workpieces therethrough, an acoustic device including transducer means for transmitting and receiving acoustic wave energy to and from said workpiece, means for supplying a liquid to form an acoustic coupling medium between said transducer means and an opposing side face of said workpiece, and receiving means for detecting reception of wave energy reflected from a fault in said workpiece, the improvement comprising:
  (a) indicator means operatively connected to said receiving means and comprising display means affording a plurality of display columns for displaying fault conditions existing in respective fractional length portions of said workpiece,
  (b) circuit means coupled to said display columns for energizing a variable length of each of said display columns in accordance with the severity of the fault condition in the fractional length pertaining thereto said workpiece, and
  (c) holding means coupled to said display column energizing means for retaining said energized condition for a sufficient period to establish simultaneously energization of at least some of said display columns.

7. The improvement claimed in claim 6 wherein each of said display columns comprises a plurality of lamps arranged in a row along the column, and wherein said holding means includes holding circuits for establishing each lamp in an energised or de-energised condition, a gate circuit feeding each holding circuit, a signal generator circuit feeding one input to each gate circuit to open only the gate circuits of each single column in succession while the fractional length of the workpiece pertaining to such column passes said transducer means, fault signal channels feeding a second input to said gate circuits and arranged so that each such channel feeds the gate circuits of corresponding lamps in the several columns, and a circuit responsive to the severity of the fault condition detected selectively to energise an appropriate number of said fault signal channels.

8. The improvement claimed in claim 7 wherein said signal generator circuit comprises a pulse generator having a rotary element positioned to engage with the workpiece during advancement thereof along said feed path, and a shift register circuit having output channels, one only of which is energised at any given time, said channels being connected each to a respective group of said gate circuits pertaining to a particular one of said columns.

9. The improvement claimed in claim 6 wherein said circuit responsive to the severity of the fault condition comprises an analogue to digital conversion circuit having output channels connected respectively to said fault signal channel, and means of energising a number of said output channels dependent upon the magnitude of an input fault signal fed thereto from said receiving means.

10. The improvement claimed in claim 9 wherein the output channels of said analogue/digital conversion circuit are connected respectively to pre-set counting circuits in the fault signal channels, and a pulse generator circuit furnishing a predetermined number of pulses per unit length of the workpiece during advancement past said transducer means is connected to fed a further input to said analogue to digital conversion circuit, each output channel whereof is thus energised or not according to whether the magnitude of the fault signal attains a predetermined value, in the former case the signal in said channel comprises a number of pulses representative of the length of the fault.

11. The improvement claimed in claim 1 further comprising:
  (a) power energized elevator means on said supporting structure above asid fed path,
  (b) means connecting said elevator means with said detector head for moving the same between an inoperative position remote from and below said feed path and an operative position adjacent to said feed path, and
  (c) co-operative guide elements carried respectively by said supporting structure and said detector head, one of which guide elements affords a flat plane guide face in a plane at right angles to said feed path and the other of which guide elements comprises a rotary element and a mounting therefor permitting such element to have rolling contact with said guide face in all directions parallel to said face.

12. Testing apparatus as claimed in claim 11 wherein said means connecting said elevator means and said detector head mounting means comprises link elements on opposite sides of said feed path and pivotally connected to said detector head and to said elevator means about axes parallel to said fed path.

References Cited

UNITED STATES PATENTS

| | | | |
|---|---|---|---|
| 2,969,671 | 1/1961 | Sproule | 73—67.9 |
| 3,159,756 | 12/1964 | Beaujard et al. | 73—67.8 XR |
| 3,289,468 | 12/1966 | Van Der Veer et al. | 73—71.5 |
| 3,327,523 | 6/1967 | Kelemencky et al. | 73—71.5 |

RICHARD C. QUEISSER, *Primary Examiner.*

JOHN P. BEAUCHAMP, JR., *Assistant Examiner.*

U.S. Cl. X.R.

73—71.5